Figure 1:
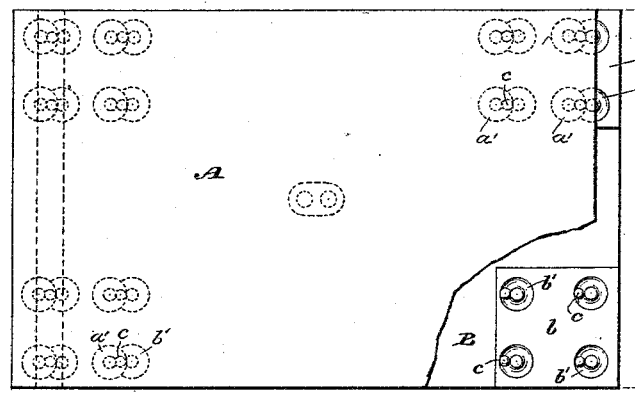

(No Model.) 2 Sheets—Sheet 1.

T. R. GRIFFITH.
MECHANICAL MOVEMENT.

No. 411,960. Patented Oct. 1, 1889.

Witnesses
Geo. W. Breck.
Edward Thorpe.

Inventor
Thomas R. Griffith
By his Attorney
Willard Parker Butler (No Model.) 2 Sheets—Sheet 2.

T. R. GRIFFITH.
MECHANICAL MOVEMENT.

No. 411,960. Patented Oct. 1, 1889.

Witnesses
Geo. W. Breck.
Edward Thorpe.

Inventor
Thomas R. Griffith
By his Attorney
Willard Parker Butler

UNITED STATES PATENT OFFICE.

THOMAS R. GRIFFITH, OF WILKES-BARRÉ, PENNSYLVANIA.

MECHANICAL MOVEMENT.

SPECIFICATION forming part of Letters Patent No. 411,960, dated October 1, 1889.

Application filed June 18, 1889. Serial No. 314,737. (No model.)

*To all whom it may concern:*

Be it known that I, THOMAS R. GRIFFITH, a citizen of the United States, and a resident of Wilkes-Barré, county of Luzerne, and State of Pennsylvania, have invented a certain new and useful Improvement in Mechanical Movements, of which the following is a specification.

The object of my invention is to provide a mechanical movement for use in connection with apparatus employed in the separation of minerals; and the particular object of my invention is to provide a mechanical movement which will impart a true gyratory motion to screens which are used for mechanical separation of coal and other minerals.

In the use of screening or other coal-separating apparatus it is desirable that a true horizontal gyratory motion should be imparted to the screen or plate which effects the separation, and to accomplish this the part to be gyrated has heretofore either been suspended by chains or upon pivoted bars, or has been mounted upon double cones placed between the inner faces of the plates or screens which compose the apparatus and arranged to roll in guide-tracks upon the surface of the stationary and movable parts of the apparatus. In each of these cases very great mechanical difficulties and objections are encountered. In the former case it is impossible to prevent more or less vertical motion being imparted to the part to be gyrated, and a considerable amount of friction and wear is produced in the bearing or suspensory parts. In the latter case the double cones, which serve as bearings, are difficult and expensive to make and soon wear out or become unevenly worn and require to be replaced, and as they become worn they impart an irregular motion to the surface to be gyrated, and, owing to their peculiar shape and great amount of bearing-surface, the amount of friction generated is very great. Moreover, owing to their peculiar shape, it is practically impossible to impart a vertical or jigging motion to the apparatus at the same time with the gyrating motion, which is desirable under certain conditions.

Now I have discovered that when an ordinary sphere of iron or other suitable material running loosely in curved grooves upon the inner surfaces of the two plates or other bodies to be gyrated is substituted for the devices above described all of the difficulties referred to are obviated, the friction is reduced to a minimum, the uneven wearing of the parts is rendered impossible, and the motion imparted to the gyrated plate or screen is much more regular and is a true gyrating motion. Moreover, the various parts of the movement are much more cheaply and readily constructed and are extremely simple, and by using this form of rolling contact a vertical or jigging motion may be imparted to the plate to be gyrated in the manner hereinafter described, which is practically impossible to accomplish with the devices above described and heretofore in use.

The invention will be best understood by reference to the accompanying two sheets of drawings, in which—

Figure 2:
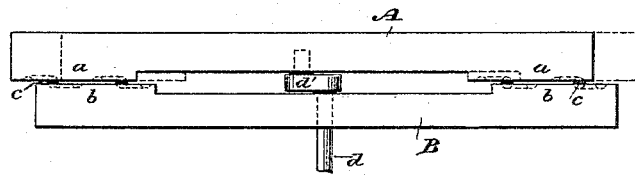
Figure 3:
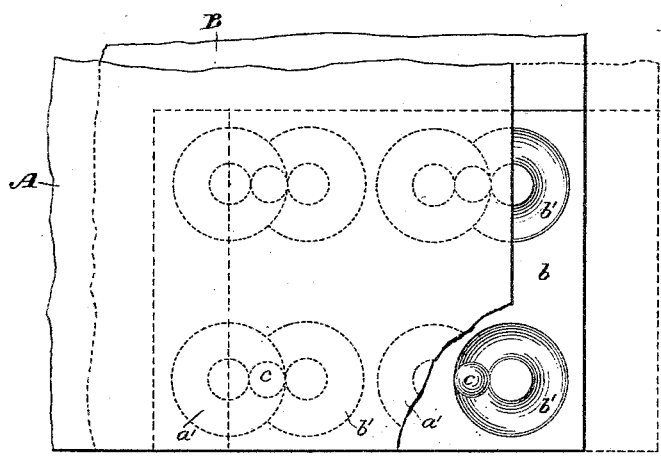
Figure 4:
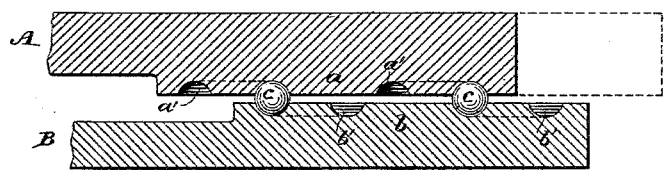
Figure 5:
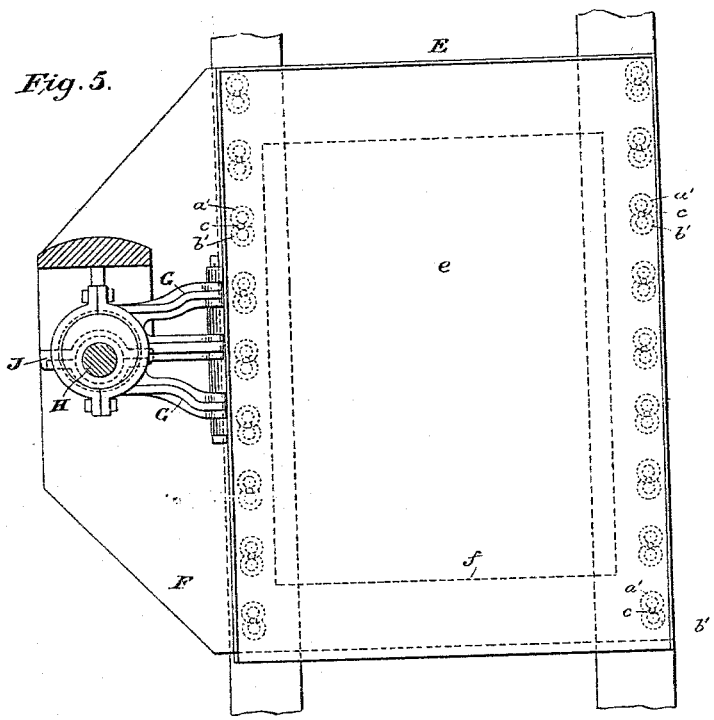
Figure 6:
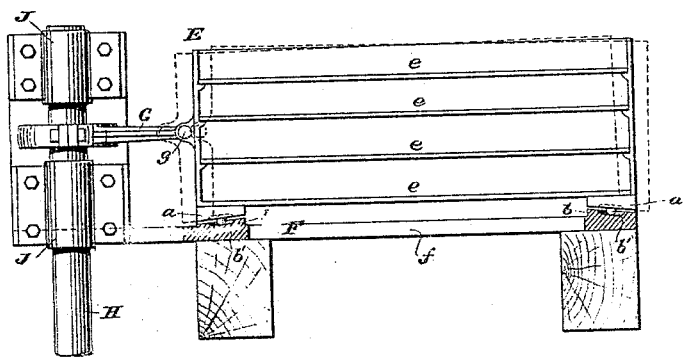

Figure 1 is a plan view of a plate to be gyrated, partly broken away, showing a stationary plate below the same and the spherical bearings. Fig. 2 is an end view of the same. Fig. 3 is an enlarged plan view of the bearings. Fig. 4 is a sectional view; Fig. 5, a plan view of an application of the mechanical movement shown in the other figures to a coal-screen, so arranged that a vertical motion is imparted to the movable plate or screen to be gyrated, also showing means for imparting motion to the same. Fig. 6 is an end view of the application shown in Fig. 5.

Similar letters refer to similar parts throughout the several views.

In the first four figures of the drawings, A represents the plate, table, or screen to be gyrated, and B the stationary supporting-plate. The two plates are substantially of the same size and shape, which may vary from time to time, as may be necessary, and they are also parallel. At each corner of the upper surface of the plate B there is a raised surface $b$, containing four depressed circular tracks or grooves $b'$ $b'$ $b'$ $b'$, circular in cross-section, as shown. These grooves or tracks may be cut or cast on the surface of the plate or screen, or may be made by fastening circular pieces of metal or wood upon the surface of the same. At each corner of the lower surface of the plate A there is a raised surface a, containing four similar tracks a' a' a' a', of the same size. The rolling connection between the two plates is effected by the spheres or globes c c, which roll in the tracks a' a' a' a' and b' b' b' b' upon the plates A and B, and at the same time serve to support the four corners of the plate A. Motion is imparted to the plate A by means of any convenient form of mechanism; but in practice a crank-shaft d, one end of which d' engages with an opening in the lower face of the plate A, will be found most convenient.

In the modified form shown in Figs. 5 and 6 the invention is practically applied to a gyrating screen E, to which a vertical or jigging motion, as well as horizontally-gyrating motion, is imparted. In these figures E represents the screen-frame, composed of a series of screens e e e, provided with meshes of suitable size. F represents the lower horizontal or stationary plate, which is made with an opening f in its center, as shown by the dotted lines in Fig. 5, to permit of the escape of the screened material, and is provided with the raised surfaces b b, extending on either side along its length. The faces of the raised portions of the plate F are inclined, as shown in Fig. 6, and the frame E of the screen has correspondingly-inclined surfaces a a on either side, as shown in Fig. 6. These surfaces contain grooves b' b' b', similar to those shown in the preceding figures, which grooves contain spheres or globes c c, which roll therein and form a rolling contact between the plate B and the screen in the same manner as before. Motion is imparted to the screen E by means of the rotating shaft H, supported in the bearings J J. This shaft carries a cam-lever G, which is connected with the screen E by means of the hinge g. The horizontal movement of the cam-lever G imparts a similar motion to the screen E, and at the same time a jigging or vertical motion is imparted to it, for the reason that the screen is forced up and down on the inclined surface a a of the bearings b b during the gyration of the former over the plate F. This gives to the screen or other body to be moved a true gyrating motion, and at the same time a vertical or jigging motion, which is very efficient in separating various classes of materials.

The crank-shaft may be operated by a belt and pulley, or in any other convenient manner, and the various details of the application of the movement—such as the number and arrangement of the bearings, &c.—may be varied from time to time as may be found necessary, the gist of the invention being in the substitution of the globe-bearing for that heretofore used.

I claim as my invention—

1. In a mechanical movement, the combination, substantially as hereinbefore set forth, of two parts, one of which is movable and the other of which is stationary, provided upon their inner faces with a circular track or bearing, and a globe or sphere placed between and having rolling contact with said tracks and arranged to furnish a rolling gyrating bearing and support for the upper of said parts.

2. As a means for enabling a relatively-gyrating motion to be produced between two parts which have parallel inner faces, and in combination therewith, a globe or sphere that is placed between and has rolling contact with said faces, substantially as and for the purposes shown and described.

3. As a means for supporting a part parallel with and enabling the same to be gyrated over a relatively stationary part, the combination therewith of two or more globes or spheres which are placed between and have rolling contact with the contiguous parallel faces of said parts, substantially as and for the purposes specified.

4. In a mechanical movement, the combination, substantially as hereinbefore set forth, of a movable part arranged to gyrate over a relatively stationary part, one or more globes placed between said parts and having rolling contact with the contiguous faces of the same, and means, substantially as described, for imparting motion to the movable part.

5. In a mechanical movement, the combination, substantially as hereinbefore set forth, of a movable part arranged to gyrate over a relatively stationary part, one or more globes placed between said parts and having rolling contact with circular guide tracks or bearings on each of the contiguous faces of said parts, and means, substantially as described, for imparting a gyrating motion to the movable part.

6. In a mechanical movement, the combination, substantially as hereinbefore set forth, of a movable part the lower face of which is composed of any number of relatively-inclined surfaces, a stationary part over which said movable part gyrates, the upper face of which is composed of an equal number of correspondingly inclined and parallel faces, one or more globes or spheres placed between any pair of the contiguous faces of said parts and arranged so as to form a rolling contact between the same and support for the movable part, and means, substantially as described, for imparting a gyrating motion to said movable part, whereby a vertical or jigging motion is at the same time imparted to the movable part.

7. In a mechanical movement, the combination, substantially as hereinbefore set forth, of a movable part the lower face of which is composed of one or more relatively-inclined surfaces, a stationary part over which said movable part gyrates, the upper face of which is composed of an equal number of correspondingly inclined and parallel surfaces, one or more globes or spheres placed between any pair of the contiguous faces of said parts, having rolling contact with circular guide tracks or bearings on each of said faces, whereby a support is formed for said movable part, and means, substantially as described, for imparting a gyrating motion to said movable part, whereby a vertical or jigging motion is at the same time imparted to the movable part.

In testimony that I claim the foregoing as my invention I have signed my name in presence of two witnesses, this 6th day of June, 1889.

T. R. GRIFFITH.

Witnesses:
WILLIAM A. RICHARDSON,
THOS. M. HELM.